United States Patent
Inon et al.

(10) Patent No.: US 6,961,414 B2
(45) Date of Patent: Nov. 1, 2005

(54) TELEPHONE NETWORK-BASED METHOD AND SYSTEM FOR AUTOMATIC INSERTION OF ENHANCED PERSONAL ADDRESS BOOK CONTACT DATA

(75) Inventors: Gadi Inon, Rosh Ha'ain (IL); Gadi Maoz, Kochau-Yair (IL)

(73) Assignee: Comverse Ltd., Tel Aviv (IL)

( * ) Notice: Subject to any disclaimer, the term of this patent is extended or adjusted under 35 U.S.C. 154(b) by 259 days.

(21) Appl. No.: 09/774,088

(22) Filed: Jan. 31, 2001

(65) Prior Publication Data

US 2002/0141546 A1 Oct. 3, 2002

(51) Int. Cl.$^7$ ................................. H04M 3/42
(52) U.S. Cl. ...................... 379/201.02; 704/246
(58) Field of Search .......................... 379/88.01, 88.02, 379/88.14, 88.17, 88.2, 88.21, 211.02, 207.12, 207.14, 207.15, 219, 223, 88.13; 704/270.1

(56) References Cited

U.S. PATENT DOCUMENTS

| | | | |
|---|---|---|---|
| 5,719,921 A | * | 2/1998 | Vysotsky et al. ............ 379/189 |
| 5,950,165 A | * | 9/1999 | Shaffer et al. ............ 379/88.17 |
| 6,282,270 B1 | * | 8/2001 | Porter ......................... 370/352 |
| 6,311,177 B1 | * | 10/2001 | Dauerer et al. .............. 345/733 |
| 6,330,308 B1 | * | 12/2001 | Cheston et al. ......... 379/218.01 |
| 6,351,222 B1 | * | 2/2002 | Swan et al. ............. 340/825.72 |
| 6,381,324 B1 | * | 4/2002 | Shaffer et al. .......... 379/207.12 |
| 6,438,215 B1 | * | 8/2002 | Skladman et al. ...... 379/201.02 |
| 6,463,413 B1 | * | 10/2002 | Applebaum et al. ......... 704/256 |

\* cited by examiner

*Primary Examiner*—Fan Tsang
*Assistant Examiner*—Ming Chow
(74) *Attorney, Agent, or Firm*—Sughrue Mion, PLLC

(57) ABSTRACT

A system and method for automatic insertion of enhanced personal address book contact data from the telephone. The PAB telephone network-based system includes an application unit to coordinate the addition of new contact data by a user via his telephone, and/or is used in conjunction with his Web-browser or other Internet/Intranet access device. The system includes an ASR recognition server used to assist in adding a new contact to the PAB, and also to match the spoken name gathered with the possible data augmented data as extracted from a system-resident white pages, or other source, such as an external white pages. The system is connected to a telephone network, or group of telephone networks including elements from one or a combination of components of E1, T1 or VoIP apparatus. When at least one name matching the new contact telephone number is found, the system attempts to automatically confirm it or choose between the names based on matching the spoken name and the textual name found using ASR. The appropriate matching name and associated data from the White pages are inserted in the PAB of the user as a new contact entry. The augmented text name of the contact can be used by the ASR subsystem to replace the original training or can be used in addition to the original training.

46 Claims, 4 Drawing Sheets

TELEPHONE NETWORK-BASED METHOD AND SYSTEM FOR AUTOMATIC INSERTION OF ENHANCED PERSONAL ADDRESS BOOK CONTACT DATA

FIELD OF THE INVENTION

The present invention relates generally to Telephone User Interfaces, and specifically to Personal Address Book applications that enable adding contacts for usage with enhanced automatic speech recognition via a telephone.

BACKGROUND OF THE INVENTION

Telephone answering (TA) applications currently use Automatic Speech Recognition (ASR) features, which enable a user to add contacts to a Personal Address Book (PAB) system via a telephone. One problem is that when a user adds a name from the telephone, he cannot assure the accuracy of the spelling of the name, because of the inaccuracy of the ASR application feature of the PAB system for alphabetic interpretation. For example, the user may receive a voicemail message from Joe Phillips, who may be previously unidentified to the user, and who leaves a message requesting a callback (the telephone number was received from a PBX, for example, and saved in addition to the message itself). The user accesses his PAB, and initiates the addition of the new contact based on his speaking both the contact's name and the telephone number that was left as part of the message. For example, Phillips sounds the same as Philips, Fillips and Filips, and therefore the ASR may spell the name incorrectly.

Even a "smart" system may do no better than "guess" at Phillips, the most common member of the homonym group.

A user is typically a subscriber of a service that is available via the telephone. This service typically includes an ASR recognizer and a PAB, and provides for the addition of contacts to the PAB directly over telephone. When the user elects to add a new contact using the telephone he:

speaks the contact's name one or more times; and enters at least one telephone number to be associated with the name. The number can be added verbally by the user directly, or by Dual Tone Multi Frequency (DTMF) keypad entry or from the data saved with the message (as received from the PBX) or the number can be added later from the Internet or some other device.

There are two shortcomings for the above process:

the ASR recognition that results from matching with an alphabetic representation of a name can be better than that of contacts added directly from the verbal input; and by using a directory, e.g. a white pages, the PAB entry can be expanded with a growing variety of useful information (e.g. name spelling, address, e-mail, other telephone numbers, SMS, etc.).

The telephone number that was added in one of the ways described earlier may not be unique to an individual, since there can be many people sharing this telephone number, e.g. a family or a company with one telephone number.

Where no name is provided, only a telephone number, current TA applications can use a directory, such as a white pages directory, based only on the telephone number that was entered. If the telephone number is found in the directory white pages, the application can insert the spelled version of the associated name into the PAB or present it to the user to approve. If many people share a number, there is no provision for differentiation between their names, and worse yet, the spelled name might not fit the contact. Where the number is for a corporation, for example, the spelled name might be that of the company as opposed to being that of the contact (the subscriber wants to have the contact's name, although it is a company telephone).

There is, therefore, a need for a PAB application that helps the user verify that the added information from an external source (e.g. a white or yellow pages) matches his contact.

SUMMARY OF THE INVENTION

Accordingly, it is a principal object of the present invention to overcome the limitations of existing telephone answering (TA) systems, having Personal Address Book (PAB) applications using automatic speech recognition (ASR), and provide improved methods and a system for correctly updating these PAB's.

It is another object of the present invention to help subscribers automatically add data to their PAB's, knowing that the automatically added data matches the contact's name as well as his telephone number.

In accordance with a preferred embodiment of the invention, there is provided a telephone network-based system for automatic insertion of enhanced contact data in a personal address book associated with a user, wherein the user has access to an electronic communications network. The system comprising:

a first application unit to host a telephone network-based system;

a second application unit programmed to present the user with contact data obtained via the electronic network, thereby assisting the user in selecting at least a portion of said contact data for entry into the personal address book, the second application unit comprising:

a voice response unit to route a user-initiated call into the system, to the second application unit;

a recognition server comprising an automatic speech recognizer for converting to text form a verbalized form of at least one new contact name forming part of the user-initiated call;

a storage unit, which stores at least one textual directory for loading into the recognition server;

a comparison unit for comparing the converted text form with a text entry in the at least one textual directory; and a textual directory unit for searching the electronic network to locate the contact data based on the converted text form of said new contact name, such that the selected contact data is inserted in the personal address book associated with the user.

In an exemplary embodiment, a telephone network-based system coordinates and optimizes the use of a PAB in conjunction with an ASR, to help identify a new contact leaving a voicemail message, and to add this contact as a new PAB entry, along with additional useful contact information, such as mailing address, e-mail address, alternate telephone numbers and other relevant information. If necessary, where a plurality of similar-sounding names exist, the inventive system helps determine which of these is correct.

While adding this information to the PAB entry, the application provides assistance to the user during an interactive session involving both a telephone interface and a Web interface. In the process of adding the contact information the user "trains" the ASR recognizer to associate the verbalized name with the contact record.

The addition of the contact information is achieved by a matching process, which uses the ASR capability of the system in the following way:

while adding the contact, the user trains the system with his voice, and the voice is recorded;
  uses the telephone number to search external sources for matching entries that can be used for augmenting the data;
  after data is augmented from the external source, e.g. the WEB, white pages or a corporate directory, the spelling of the found names is fed into the ASR as the words that the ASR should search for;
  the system plays the recorded voice to the recognizer and commands it to recognize the name; and
  if the ASR finds a match between the recorded name and one of the names gathered from the external source, a positive match is declared.

The invention assures that the augmented data from any external address book (AB) matches the name of the contact spoken by the subscriber. Matching the spoken name to the textual name found in the external AB, by using ASR technology, is the mechanism by which this assurance is provided.

The inventive system enables the user to easily add a new PAB entry, and to automatically supplement the entry with additional contact data associated with the contact, with the knowledge that the added data also "belongs" to the contact.

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

Figure 1:
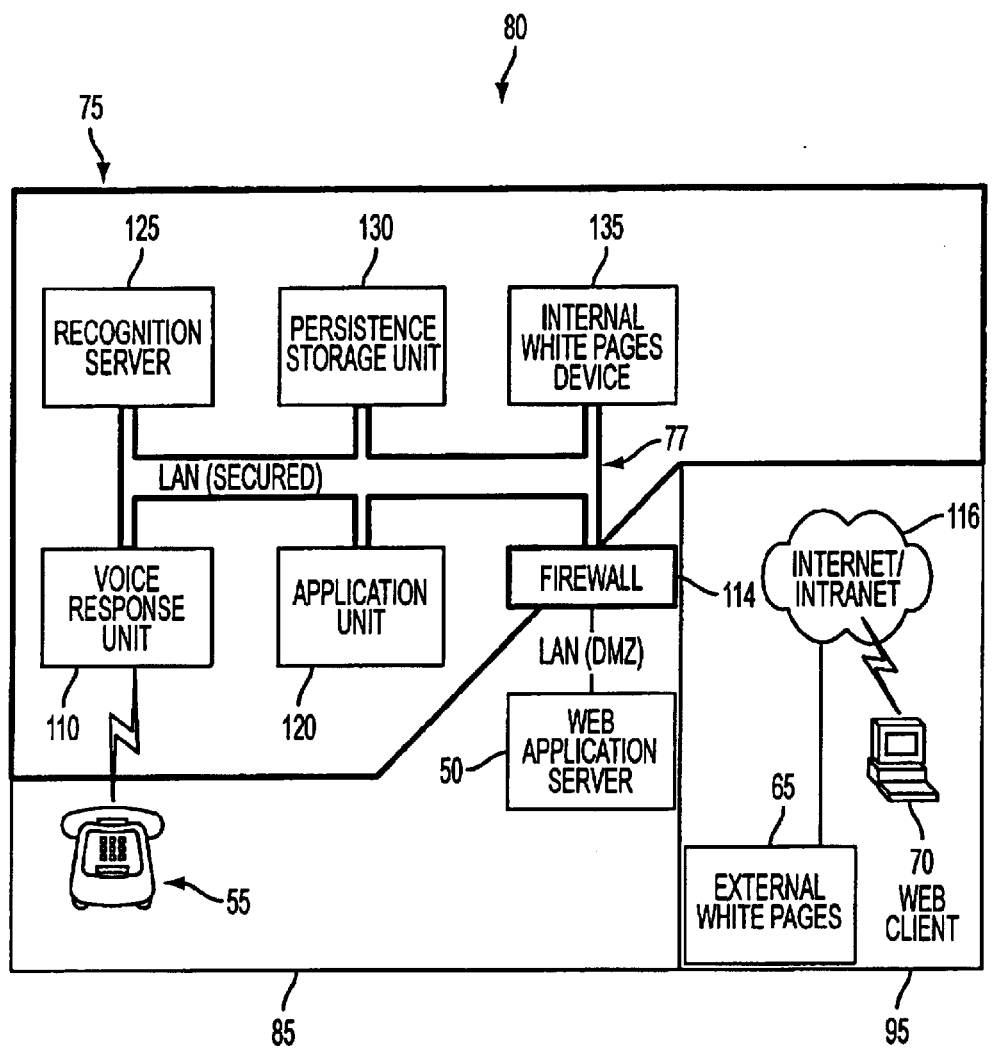
FIG. 1 is a schematic illustration of a telephone network-based system for new contact insertion in a PAB, in conjunction with a Web interface, in accordance with an exemplary embodiment of the present invention.

Reference is now made to FIG. 1, which is a schematic illustration of a telephone network-based system for new contact insertion in a PAB, in conjunction with a Web interface, in accordance with an exemplary embodiment of the present invention. The system enables the user to operate with the voice-based technology of a telephone network, and the text-based technology of the Web, to achieve the inventive objects of automatic insertion of contact data into a PAB, in an enhanced fashion.

The system 80 involves two main types of interaction with the subscriber, i.e., a telephone network interface 55 and an Internet or Web interface 116, which may also be in the form of an organizational Intranet interface, such as IBM's global virtual machine (VM) network. The following acronyms associated with an exemplary embodiment now apply:

| AB | Address Book |
|---|---|
| APU | Application Unit |
| GAB | Global Address Book |
| PAB | Personal Address Book |
| PSU | Persistence Storage Unit |
| RSU | Recognition Server |
| UI | User Interface |
| VoIP | Voice over Internet Protocol |
| VRU | Voice Response Unit |

The connection to Internet/Intranet 116 can optionally include a Firewall 114. In this case the LAN system is divided into three zones: a LAN secured zone 75, a LAN Demilitarized Zone (DMZ) 85 and an Internet Zone 95.

DMZ is a military term referring to an area between two opponents, where fighting is prevented. In a networking context, a DMZ refers to a network added between a protected network and an external network in order to provide an additional layer of security. However, when a business actually does want someone on the Internet to be able to access one of its servers, such as its Web server, an option is to place the server in question in a neutral zone between the private network and the Internet. Technically, the server is placed on a separate portion (subnet) of the local network, and then non-authenticated access is permitted to that specific portion. Such a separate portion of the local network is referred to as the De-Militarized Zone, or DMZ.

DMZ 85 becomes an inserted neutral communication zone. Basically, DMZ 85 is open to most Internet users that can benefit from a company's offerings, its Web documents, etc. Firewall (FW) 114 can, however, prevent users from crossing into DMZ 85. FW 114 allows no connections to be made directly from Internet zone 95 to secured zone 75. The road is simply blocked by the firewall 114. However, Web application server 50 located in DMZ 85, when serving a request from Internet 116, can access the data and Web application servers 50 in secured zone 75.

The types of subscriber interfaces are now described:

i. A telephone Network—this connection is established by a voice response unit (VRU) 110, by connecting to a telephone network 55. The connectivity can be via European telephony trunks E1, or non-European telephony trunks T1, Voice over IP (VoIP) connection type or any other type of telephone connection (such as Analog lines etc.). When a subscriber calls into the system, VRU 110 routes the call to the user interface (UI) application that is hosted in an application unit (APU) 120. APU 120 loads the subscriber data from a persistence storage unit (PSU) 130, which, for example, can be a directory server, database or a file system comprising a centralized data source.

At some time before recognition is required, APU 120 commands the recognition software that resides in a recognition server (RSU) 125 to load the personal address book (PAB) and one or more global address books (GAB's) that are relevant to the subscriber. In some implementations APU 120 loads the address books (AB) and passes them to RSU 125 rather than RSU 125 loading them from PSU 130 directly.

The ASR software residing in RSU 125 can recognize the names in the PAB based on two types of "Contact" enrollment:

a. The subscriber adds the name using the telephone system via a training session. The training session includes the following exemplary steps:
   APU 120 commands RSU 125 to start Voice Enrollment;
   the subscriber is asked to speak the name of the new contact;
   after prompting the subscriber (i.e., "enter the contact's name") VRU 110 passes the PCM (voice) data to RSU 125;
   the ASR in RSU 125 "learns" the voice pattern and also records the original PCM data; it then returns to the application a rating number reflecting the quality of the training;
   based on the quality of the training APU 120 decides whether to undergo another cycle of training; and
   when the training is complete, APU 120:
      i. commands RSU 125 to update the PAB data of the subscriber with the new contact information (so that it can be recognized next time); and
      ii. reads the PCM data from RSU 125 and saves it to the PAB to be used to echo the contact's name for future verification.
      Note: the actual saving of data to the PAB in i & ii can be done either by the ASR or the application.
b. Add a name, for example, via WEB insertion of the contact name in text format as described hereinbelow. In this case the name can be saved for recognition in the PAB in one of two ways:
   use the text representation and load it into RSU 125 when required; and
   partially, or completely, translate the name into a more "favorable" format for RSU 125, thereby easing the load resource requirement, e.g. less CPU usage and less elapsed time.

At that point, a telephone network-based system session is initiated either by the system or by the subscriber who, for example, can then say "Call John Jones," where John Jones is an entry in one of the GAB's or the PAB.

As further described hereinbelow with reference to FIG. 3, the session continues in accordance with the steps shown in the flowchart.

In some alternative implementations the four logical units described above can be allocated to different physical units. Any combination is possible, e.g. APU 120, VRU 110 and RSU 125 are on one physical unit and PSU 130 on a separate physical unit.

Figure 2A:
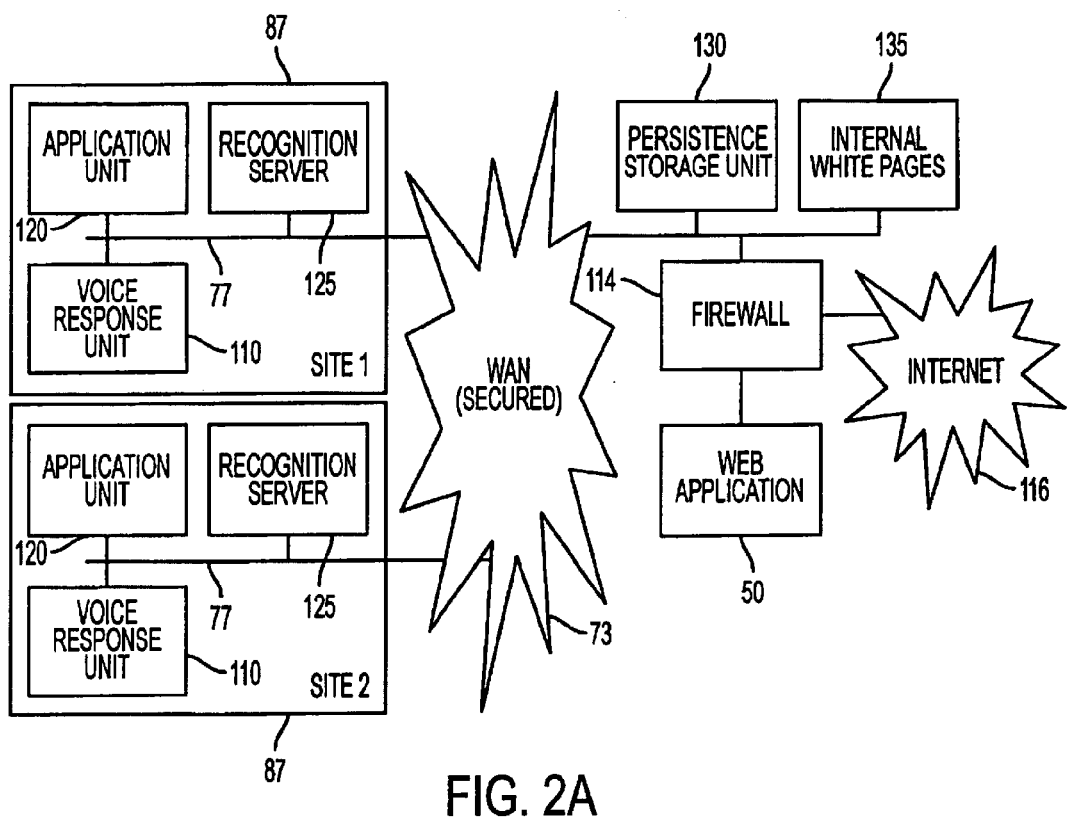
FIG. 2A is a schematic illustration of the telephone network-based system for new contact insertion in a PAB of FIG. 1, wherein the APU, RSU and VRU functions are distributed over more than one site, in accordance with an exemplary embodiment of the present invention.

If VoIP is the type of network connectivity being utilized, the VRU can be placed in the DMZ zone (as in FIG. 2).

In accordance with the principles of the present invention, once the telephone network-based system has added "John Jones" as an entry with or without at least one telephone number, the inventive system can access from the Web, for example, additional information associated with this contact and automatically insert this information into the PAB of the user.

ii. WEB access, or any other possible way of inserting textual information, for example using a corporate intranet—is used in this application for updating the PAB or a GAB in PSU 130, with a work telephone number, for example. The subscriber, seated at his WEB Client browser 70, which can be a Personal Computer (PC), Wireless Access Protocol (WAP) telephone, Personal Digital Assistant (PDA) or any other such Web-based personal device, logs into the application via the Internet or Intranet 116. Once the subscriber is logged onto the Web, an application begins to run in a WEB application server 50. The application enables the user to update the PAB or a GAB via the web page so that the subscriber can use the updated PAB or GAB via the telephone thereafter. The subscriber usually edits the PAB, and usually someone else that was assigned by the organization edits the GAB, wherein the organization members are included in the GAB.

The white pages device 135, shown in FIGS. 1 and 2, is a logical device that represents a textual directory unit that can be a source for searching for contact data based on a telephone number. This device can, for example, be one of the following, or any combination of them:
   a directory server of a database server containing a white pages list or a Yellow pages list;
   a Human Resources Database of the organization to which the subscriber belongs;
   a voice mail system list of users; and/or
   a more general search engine function, such as that used by Yahoo that can be located in the internet zone with or without some "Proxy agent" in the DMZ zone.

When a name is added, or edited, via the Web in a text format, it is required to save the ASR data in the more "favorable" text format found by means of the Web, then the Web application Commands the RSU 125 (or, optionally, another unit hosting the ASR engine in the secured or DMZ zone) to "compile" the text name to that format and save it in PSU 130 for loading as described earlier (alternatively the Web application can ask RSU 125 to compile the data and return the "compiled" format, and it is then saved to PSU 130).

FIG. 2 is the schematic illustration of the telephone network-based system for new contact insertion in a PAB of FIG. 1, wherein the "front-end" APU, RSU and VRU functions are distributed over more than one site, in accordance with an exemplary embodiment of the present invention. The system, as shown in FIG. 2, can thus, alternatively, be spread over multiple locations. For example, PSU 130, DMZ 85 and white pages device 135 can be in a centralized location, while there are a plurality of remote sites 87 for example, Washington and New York, each containing a VRU 110, an APU 120 and an RSU 125. All sites 87 have internal LAN's 77, and there is a wide area network (WAN) 73 connecting all sites 87.

Figure 2B:
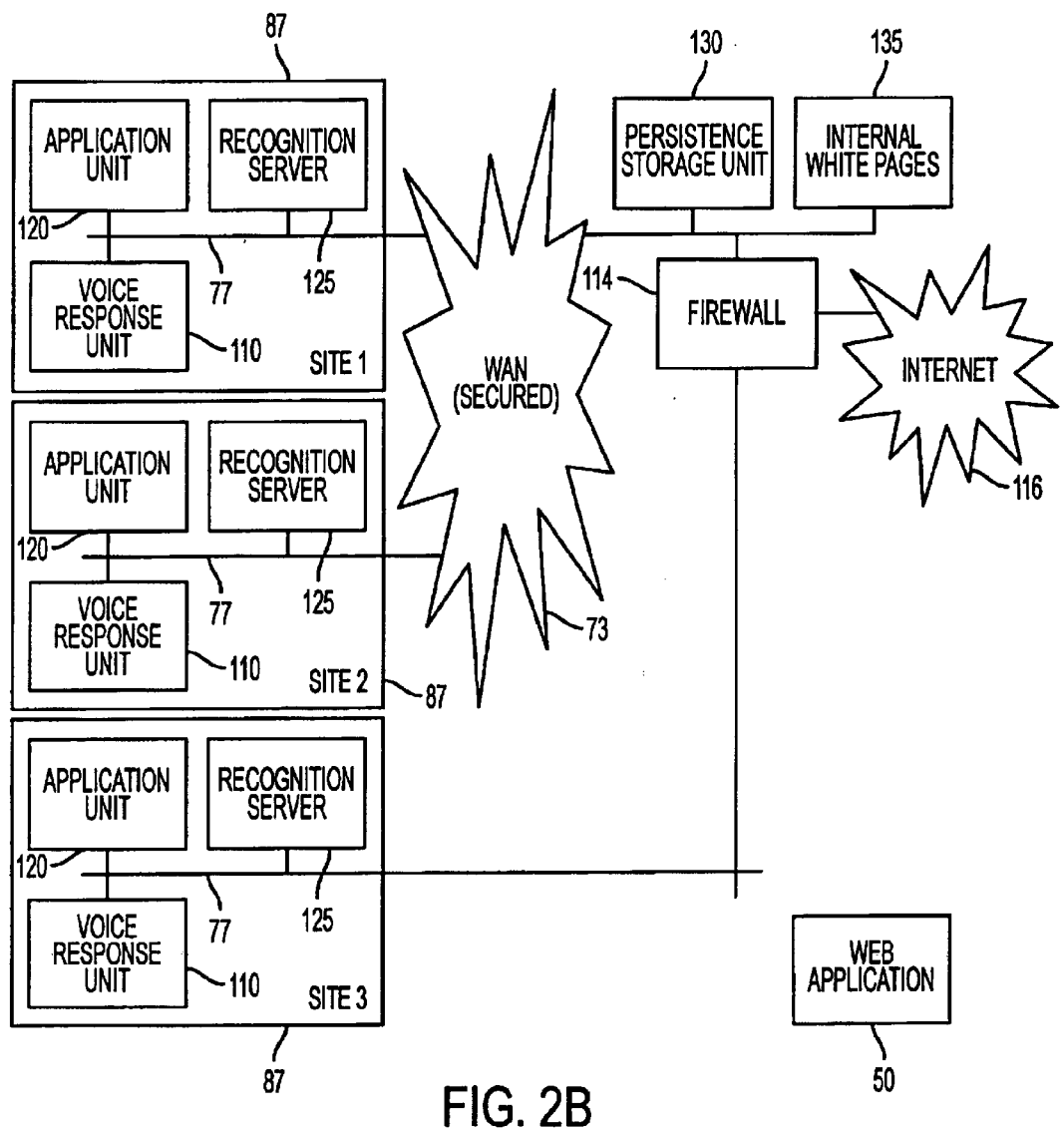
FIG. 2B is a schematic illustration of the telephone network-based system for new contact insertion in a PAB of FIG. 1, wherein the APU, RSU and VRU functions are distributed over more than one site and for one site they are located within the DMZ, in accordance with an exemplary embodiment of the present invention.

When VoIP connectivity is used the VRU can be located in the DMZ zone so that access from the Internet zone is enabled. In this case the APU and RSU can be located either in the DMZ zone as well or in the secured zone. Site 3, shown in FIG. 2B illustrates a case where the VRU, APU and RSU are all located in the DMZ.

Figure 3:
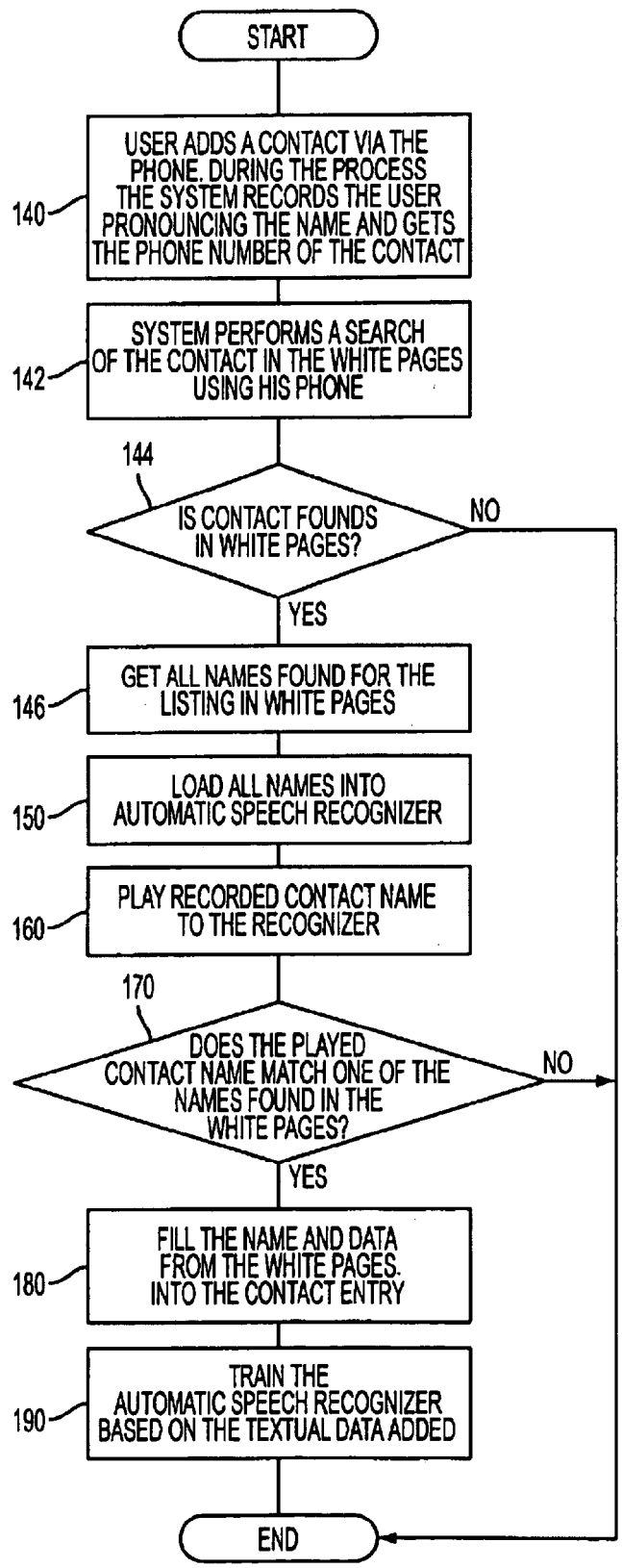
FIG. 3 is a flow chart of the PAB contact addition process for a subscriber accessing the system, in accordance with an exemplary embodiment of the present invention.

FIG. 3 is a flow chart of the PAB contact addition process, for a subscriber accessing the system, in accordance with an exemplary embodiment of the present invention.

In block 140, the subscriber adds a contact to the PAB via the telephone. As part of the addition of the entry, the system records the subscriber pronouncing the name, and the system gets the telephone number of the contact, for example, from the voice of the user also pronouncing the number. APU 120, which controls the telephony session, searches any external directory that is configured into the system, and uses the entered telephone number in searching for an entry that matches the telephone number. The unit that assists in searching the entry can be for example white pages 135, or other relevant address book (AB) directory, such as a yellow pages or a corporate directory. In block 142 the system performs a search of the contact in white pages 135 using the telephone number of the contact. In block 144 APU 120 determines if the contact is found in white pages 135, and if not, the process ends.

After retrieving all entries that are found to match the telephone number (at least one), a capability known in the art, the system 80 operates in accordance with the principles of the present invention, to ascertain that the name found matches the name added in 140. If more than one entry was returned, then the system attempts to find if one of the names matches the pronounced name. To do so, APU 120 in block 146 gets all names from the external AB, and in block 150 loads them to the ASR recognizer in RSU 125.

Subsequently, whether either one or more names are found, in block 160 the system plays the recorded contact name to the recognizer as was recorded in block 140. In block 170 the system determines if the played contact name matches one of the names found in white pages 135. If no match is found the process ends. If a unique match, with quality above a given threshold is found, then in block 180 the system fills in all data found in White pages 135, e.g. name, e-mail, address, work telephone number, etc., into the contact entry in PSU 130. If the process does end, then in block 190 APU 120 can decide to train the ASR to recognize this contact based on the textual name that was added. The text representation (with or without partial compilation) can either be added to the original training, or replace it. In case the ASR returns a quality that is not above a given threshold, then if this quality applies only to one entry, then the user is asked to approve the addition of that entry. If there are a few names that are returned with this quality the user is asked to choose between them.

In case the session has ended due to no match found, as in block 170, then depending on the system configuration, the subscriber can be offered a name from the names found.

If the telephony session only entered the name of the new contact, but the telephone number of the contact was added via a search using Web 116, then the previous algorithm is also executed under the control of Web Application server 50. In this case RSU 125 can optionally be located in DMZ zone 85, or can even be hosted in server 50 itself. The answer returned after augmentation is presented on the Web page for this contact. If the ASR is not above the threshold quality, a dialog box for either approving, or choosing between the possible alternatives, is displayed. If no match is found, the list can still be presented, and the user can choose to augment from among the listed names.

It will be appreciated that the preferred embodiments described above are cited by way of example, and that the present invention is not limited to what has been particularly shown and described hereinabove. Rather, the scope of the present invention, as defined by appended claims, includes both combinations and sub-combinations of the various features described hereinabove, as well as variations and modifications thereof, which would occur to persons skilled in the art upon reading the foregoing description, and which are not disclosed in the prior art.

What is claimed is:

1. A telephone network-based system for automatic insertion of web-enhanced contact data into a personal address book associated with a user that has access to an electronic communications network, said system comprising:
   a first application unit operable to host the telephone network-based system;
   a second application unit programmed to present the user with contact data obtained via the electronic communications network and assist the user in selecting at least a portion of the contact data for entry into the personal address book, said second application unit comprising:
   a voice response unit operable to route a user-initiated call into the system, to said second application unit;
   a recognition server comprising an automatic speech recognizer operable to convert a verbalized form of a new contact name to a text form, wherein the text form of the new contact name forms part of the user-initiated call;
   a storage unit operable to store at least one textual directory for loading into said recognition server;
   a comparison unit operable to compare the converted text form of the new contact name with a plurality of text entries in the at least one stored textual directory; and
   a textual directory unit for searching the electronic communications network to locate and select the contact data based on a telephone number corresponding to the new contact name, wherein the selected contact data is inserted into the personal address book associated with the user and wherein further, the selected contact data is data other than the new contact name and the telephone number corresponding to the new contact name.

2. A system according to claim 1, wherein said first and second application units, said voice response unit, said recognition unit and said storage unit are each hosted on different physical units.

3. A system according to claim 1, wherein said first and second application units, said voice response unit, said recognition unit and said storage unit are hosted on the same physical unit.

4. A system according to claim 1, wherein two of the group comprising said first and second application units, said voice response unit, said recognition unit and said storage unit are hosted on different physical units.

5. A system according to claim 1, wherein three of the group comprising said first and second application units, said voice response unit, said recognition unit and said storage unit are hosted on different physical units.

6. A system according to claim 1, and further comprising a firewall.

7. A system according to claim 1, wherein said second application unit loads the at least one textual directory for transfer to said storage unit.

8. A system according to claim 1, wherein said telephone network is comprised of at least one element from the group including E1 components, T1 components and voice over Internet protocol components.

9. A method for adding data for a new contact from at least one textual directory to a personal address book (PAB) of a telephone network user, wherein the call via the telephone of the user is coupled to an electronic network via an applications system comprising an automatic speech recognizer (ASR) and a storage unit, said method comprising:
   recording the pronunciation of the name of the new contact by the user over the user's telephone;
   obtaining a telephone number corresponding to the name of the new contact;
   searching said at least one textual directory for at least one telephone number matching the obtained telephone number corresponding to the new contact;
   obtaining at least one name associated with each of the at least one matching telephone numbers;
   loading said ASR with said at least one associated name;
   playing the recorded contact name to the ASR;
   determining whether said at least one associated name matches said pronounced name; and
   if one of the associated names matches said pronounced name, obtaining associated textual data other than the name and associated telephone number for the matching name and entering said matching name and the textual data into said PAB.

10. A method according to claim 9, wherein said recording of the pronunciation comprises recording of the name and the number of the new contact.

11. A method according to claim 10, wherein said obtaining is from said recording of said pronunciation of said number.

12. A method according to claim 9, further comprising calling into the system, wherein said calling is performed by said user.

13. A method according to claim 9, further comprising routing of said call to the system by a voice response unit.

14. A method according to claim 9, wherein said obtaining is from a Web-based device coupled to the system, wherein said coupling is to a recognition server via an application unit.

15. A method according to claim 9, wherein said obtaining is from a Web-based device wherein said number is vocalized.

16. A method according to claim 9, further comprising converting of said name and telephone number from speech to text form by said recognition server.

17. A method according to claim 9, further comprising loading a textual directory by said second application unit from a persistence storage unit coupled to the system, to said recognition server.

18. A method according to claim 9, further comprising training said ASR based on said associated textual data.

19. A method according to claim 9, further comprising asking said user to approve said associated name.

20. A method according to claim 9, and comprising asking said user to approve said associated textual data.

21. A method according to claim 9, wherein the source of said at least one textual directory is the Internet.

22. A method according to claim 9, wherein the source of said at least one textual directory is an intranet.

23. A method according to claim 9, wherein the source of said at least one textual directory is a directory server.

24. A method according to claim 9, wherein the source of said at least one textual directory is a file.

25. A method according to claim 9, wherein the source of said at least one textual directory is a virtual memory source.

26. A method according to claim 9, wherein the source of said at least one textual directory is a management system.

27. A method according to claim 9, wherein said name pronunciation recording is a transcription transferred by said system from said storage unit to said ASR.

28. A method according to claim 9, wherein the user is prompted to choose from at least two versions of said at least one matching name found.

29. A method of storing information related to a new contact to an address book, said method comprising:
(a) recording a first identifying information of the new contact and playing the first identifying information to an Automatic Speech Recognizer (ASR);
(b) obtaining second identifying information, different than the first identifying information, corresponding to the new contact;
(c) using the second identifying information to search the electronic communications network to locate and select data that matches the second identifying information and secondary data that corresponds to the primary data;
(d) determining if the found primary data matches the recorded first identifying information of the new contact and, if so,
storing the primary and secondary data in the address book.

30. The method defined in claim 29, wherein said first identifying information is a pronunciation of the new contact's name.

31. The method defined in claim 30, wherein said using the recorded pronunciation to select the entry comprises supplying the recorded pronunciation and the selected entry to a speech recognizer.

32. The method defined in claim 29, wherein said first identifying information is a telephone number of the new contact.

33. The method defined in claim 31, wherein a text name from each of a plurality of entries in the directory is supplied to the speech recognizer.

34. The method defined in claim 33, wherein the selected entry is selected based on a match between the recorded pronunciation and the text name in the selected entry.

35. The method defined in claim 29, further comprising:
verifying that the stored selected entry in said address book accurately identifies the new contact.

36. A method of adding contact information related to a new contact to a personal address book comprising:
(a) recording a verbalized form of first identifying information corresponding to the new contact and playing the first identifying information to an Automatic Speech Recognizer (ASR);
(b) obtaining second identifying information, different than the first identifying information, corresponding to the new contact, wherein the second identifying information is obtained by recording a verbalized form of the second identifying information;
(c) using the second identifying information to search an electronic communications network to locate a data entry for which a portion of the data entry matches the second identifying information; and
(d) copying contact information from the selected data entry to the personal address book, wherein the copied contact information is other than the first and second identifying information.

37. The method defined in claim 36, wherein said using the recorded pronunciation to select an entry comprises supplying the recorded pronunciation and the text name to a speech recognizer.

38. The method defined in claim 37, wherein a text name from each of a plurality of entries in the directory is supplied to the speech recognizer.

39. The method defined in claim 35, wherein the selected entry is selected based on a match between the recorded pronunciation and the text name in the selected entry.

40. The method defined in claim 35, further comprising:
verifying that the stored text name in said personal address book accurately identifies the new contact.

41. The method defined in claim 35, wherein the first identifying information comprises the new contact's name.

42. The method defined in claim 35, wherein the second identifying information comprises at least a portion of the new contact's telephone number.

43. The method defined in claim 35, wherein the contact information comprises a textual representation of the new contact's name.

44. A system as claimed in claim 1, wherein said comparison unit is further operable to compare a text form of an entered number that is associated with the name of the new contact with numbers in the at least one stored textual directory.

45. A system as claimed in claim 44, wherein said textual directory unit is further operable to search the electronic communications network to locate the contact data based on the text form of the number that is associated with the name of the new contact.

46. A system as claimed in claim 1, wherein the electronic communications network comprises the Internet.

* * * * *